United States Patent
Garnit et al.

(10) Patent No.: US 8,778,548 B2
(45) Date of Patent: Jul. 15, 2014

(54) DELIVERY HEAD FOR A FUEL CELL

(75) Inventors: Sadok Garnit, Plessis Robinsor (FR);
Francis Roy, Les Ulis (FR); Guillaume Joncquet, Paris (FR); Jean-Philippe Poirot-Crouvezier, St. Georges de Commiers (FR)

(73) Assignees: Commissariat a l'Energie Atomique et aux Energies Alternatives, Paris (FR); Peugeot Citroen Automobiles SA, Velizy Villacoublay (FR)

( * ) Notice: Subject to any disclaimer, the term of this patent is extended or adjusted under 35 U.S.C. 154(b) by 336 days.

(21) Appl. No.: 13/001,468

(22) PCT Filed: Jun. 15, 2009

(86) PCT No.: PCT/EP2009/057385
§ 371 (c)(1),
(2), (4) Date: Jun. 30, 2011

(87) PCT Pub. No.: WO2009/156295
PCT Pub. Date: Dec. 30, 2009

(65) Prior Publication Data
US 2011/0262821 A1    Oct. 27, 2011

(30) Foreign Application Priority Data
Jun. 27, 2008  (FR) .................................. 08 03637

(51) Int. Cl.
*H01M 2/02* (2006.01)

(52) U.S. Cl.
USPC ........................................... 429/428

(58) Field of Classification Search
None
See application file for complete search history.

(56) References Cited

U.S. PATENT DOCUMENTS

| 2004/0229098 A1* | 11/2004 | Fujita ............................ 429/25 |
| 2005/0244686 A1* | 11/2005 | Kamihara ...................... 429/22 |
| 2006/0093890 A1* | 5/2006 | Steinbroner .................... 429/37 |
| 2008/0057372 A1* | 3/2008 | Sommer et al. ................. 429/34 |
| 2010/0178576 A1* | 7/2010 | Olsommer et al. ........... 429/434 |

FOREIGN PATENT DOCUMENTS

| FR | 2892234 | 4/2007 |
| JP | 2003178791 | 6/2003 |
| JP | 2006172953 | 6/2006 |
| JP | 2007265799 | 10/2007 |
| JP | 2007273413 | 10/2007 |
| WO | 2007010372 | 1/2007 |

\* cited by examiner

*Primary Examiner* — Patrick Ryan
*Assistant Examiner* — Wyatt McConnell
(74) *Attorney, Agent, or Firm* — Nicolas E. Seckel

(57) ABSTRACT

The invention relates to a fluid delivery head for an electrochemical cell, for example a fuel cell. The delivery head combines the inlets and outlets of the lines for delivering the fluids, notably hydrogen and oxygen. The hydrogen delivery line feeds an active part of the fuel cell and includes a cavity in communication with a discharge pipe via a solenoid valve. The invention performs several functions with a minimum of elements and with reduced bulk.

21 Claims, 2 Drawing Sheets

DELIVERY HEAD FOR A FUEL CELL

CROSS-REFERENCE TO RELATED APPLICATIONS

This application is a National Stage of International patent application PCT/EP2009/057385, filed on Jun. 15, 2009, which claims priority to foreign French patent application No. FR 08 03637, filed on Jun. 27, 2008, the disclosures of which are incorporated by reference in their entirety.

FIELD OF THE INVENTION

The invention relates to a fluid delivery head for an electrochemical cell. The invention also relates to a fuel cell equipped with such a fluid delivery head.

BACKGROUND OF THE INVENTION

Electrochemical cells are energy conversion devices. These devices are generally classified as a function of the direction of the energy conversion. Devices that produce chemical energy from electrical energy are referred to as electrolytic cells, whereas devices that produce electrical energy from chemical energy are referred to as fuel cells or batteries.

A fuel cell enables the production of electricity by means of two coupled chemical reactions: the oxidation of a reductive fuel on a first electrode, known as the anode, and the reduction of an oxidizing agent on a second electrode, known as the cathode. At the present time, hydrogen is commonly used as combustible and atmospheric oxygen is used as oxidizing agent.

A fuel cell finds particular usefulness in the field of transport, which, hitherto, has essentially used fossil energy mainly derived from petroleum. The use of this energy produces a large amount of carbon dioxide that contributes toward increasing the greenhouse effect on the planet. Other pollutants, such as particles or nitrogen oxides, are also produced by the use of petroleum-based fuels.

The main advantage of using a fuel cell using hydrogen and oxygen as feed gases is that the only product of the chemical oxidation and reduction reactions is water.

Among the various types of fuel cell that may be distinguished is the proton exchange membrane fuel cell, also known as a polymer electrolyte membrane fuel cell. Such a cell is formed from an elemental cell or a stack of elemental cells intercalated between a terminal plate forming the anode and a terminal plate forming the cathode.

FIG. 1 diagrammatically shows a proton exchange membrane fuel cell comprising a single elemental cell 1 intercalated between an anode 2 and a cathode 3. The elemental cell 1 comprises a polymer electrolyte membrane 4, known as the membrane 4, intercalated between two active layers 5a and 5b, for example of porous carbon. Each active layer 5a, 5b is in contact with a diffusion layer 6a or 6b, respectively, for example a paper or carbon fabric substrate. The diffusion layers 6a and 6b allow diffusion of the feed gases originating from delivery lines 7a and 7b to the active layers 5a and 5b, respectively. The delivery lines 7a and 7b are, for example, partly housed in bipolar plates 8a and 8b. In this figure, the bipolar plates 8a and 8b are directly in contact with the anode 2 and the cathode 3. Needless to say, in the case of a stack of elemental cells 1, a bipolar plate 8b of a first elemental cell comes into contact with a bipolar plate 8a of a second elemental cell, and so on.

In a proton exchange membrane fuel cell using hydrogen and oxygen as feed gases, the hydrogen is introduced in gaseous form at the anode 2, for example via the delivery line 7a, while the oxygen is introduced, also in gaseous form, at the cathode 3, for example via the delivery line 7b. In the presence of a catalyst, for instance platinum contained in the active layer 5a, the hydrogen releases electrons $e^-$ according to the following oxidation reaction:

$$H_2 \rightarrow 2H^+ + 2e^-$$

The electrons $e^-$ released into the active layer 5a join the active layer 5b via an electrical circuit 10 using the electrical energy produced by the fuel cell, and the protons $H^+$, released during this first reaction, migrate to the active layer 5b by crossing the membrane 4. At the active layer 5b, the protons $H^+$ combine with oxygen $O_2$ and with the electrons $e^-$, again in the presence of a catalyst, according to the following reduction reaction:

$$2H^+ + \tfrac{1}{2}O_2 + 2e^- \rightarrow H_2O$$

Overall, the following redox reaction takes place:

$$H_2 + \tfrac{1}{2}O_2 \rightarrow H_2O$$

For a better energy yield, the oxidation and reduction reactions must take place within a certain temperature and pressure range. To ensure this adequate operating temperature, a heat-exchange fluid maintained at a temperature within this temperature range circulates in a pipe passing around or through the elemental cells 1.

The functioning of a fuel cell requires numerous fluid exchanges with devices peripheral to the fuel cell. In particular, the heat-exchange fluid requires passage through a device for maintaining its temperature. Similarly, the delivery lines 7a and 7b need to be connected to hydrogen and oxygen feed circuits. For the sake of reducing the bulk, the fluid delivery lines may open into the same component, known as the fluid delivery head or, more simply, the delivery head.

FIGS. 2a and 2b represent an example of a delivery head 21 in front view and cross-sectional view, respectively.

The delivery head 21 comprises an inlet connector 22a connected to the heat-exchange fluid pipe 23 at an inlet orifice 24a. The pipe 23 comprises a pipe portion 23a integrated into the delivery head 21. The pipe 23 extends inside or around the elemental cell(s) 1 and ends with a pipe portion 23b, which is, for example, integrated into the delivery head 21. This pipe portion 23b comprises an outlet orifice 24b that can receive an outlet connector, not shown. The delivery head 21 also comprises an inlet orifice 26a and an outlet orifice 26b for connecting the delivery line 7a to an external circuit such as a hydrogen feed circuit, and also an inlet orifice 28a and an outlet orifice 28b for connecting the delivery line 7b to an external circuit such as an oxygen feed circuit.

For correct functioning of the fuel cell, the membrane 4 must contain water in order to allow the transfer of protons $H^+$ from the active layer 5a on the anode 2 side to the active layer 5b on the cathode 3 side. The membrane 4 is water-permeable. Consequently, a transfer of water takes place from the cathode 3 to the anode 2 via a diffusion mechanism due to the difference in water concentration on each side of the membrane 4. This water diffusion mechanism cohabits with a diffusion of other species such as nitrogen. Due to the temperature of the fuel cell, the water exiting the delivery line 7a is essentially present in gaseous form. In order to optimize the yield of the cell and to increase its service life, this water and the other species such as nitrogen are reinjected into the inlet of the delivery line 7a with the hydrogen. The circulation of hydrogen and the reinjection of water and nitrogen may be ensured by a circuit external to the fuel cell, comprising, for example, a pump or an ejector 30, shown in FIGS. 2a and 2b. The amount of water present in liquid form must, however, be precisely controlled. The reason for this is that an excessive amount of water in the elemental cell 1 prevents the feeding of hydrogen and oxygen to the active layers 5a and 5b, resulting in a voltage inversion at the terminals of the fuel cell and thus to electrolysis of water. In certain cases, for example in the case of a strong current demand, the fuel cell may be destroyed. In order to limit the risks of injection of water in liquid form at the inlet of the delivery line 7a, it is possible to place a conventional phase separator in the hydrogen feed circuit upstream of the delivery line 7a. However, such a phase separator is generally bulky. This bulk is an inconvenience for portable use. Moreover, a phase separator placed upstream of the delivery line 7a cannot control the amount of water present in liquid form within the elemental cell 1 due to the absence of control of the condensation of water in the pipe connecting the separator to the inlet orifice 26a.

SUMMARY OF THE INVENTION

One aim of the invention is notably to overcome all or some of the abovementioned drawbacks by proposing a sparingly bulky device that can control the amount of water inside the elemental cells 1. To this end, one subject of the invention is a fluid delivery head comprising a line for delivering a fluid to an active part of an electrochemical cell, characterized in that the delivery line comprises a cavity in communication with a discharge pipe via a solenoid valve. A subject of the invention is also a fuel cell comprising an elemental cell in which takes place a redox reaction that can generate an electrical current between two electrodes of the fuel cell, characterized in that it comprises a delivery head according to the invention.

An advantage of the invention is notably that it can control the amount of water present in liquid form in the fuel cell with a minimum of bulk. The invention also minimizes the length of the hydrogen feed circuit and, consequently, limits the condensation. The water in gaseous form is thus preserved and is reinjected into the inlet of the hydrogen delivery line, ensuring an increase in the service life of the fuel cell.

BRIEF DESCRIPTION OF THE DRAWINGS

The invention will be better understood and other advantages will emerge on reading the detailed description of an embodiment given as an example, the description being made with regard to the attached drawings, which show.

DETAILED DESCRIPTION

For the rest of the description, a fuel cell, for example a proton exchange membrane fuel cell, will be considered using hydrogen and oxygen as feed gases. However, it is possible to use other feed gases without departing from the scope of the invention. Furthermore, the invention equally applies to other types of fuel cell and, in general, to any electrochemical cell.

Figure 1:
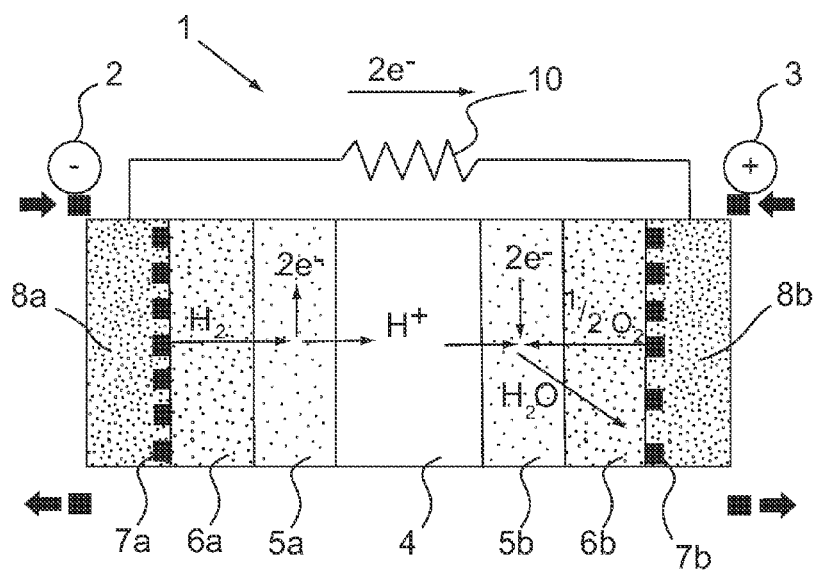
FIG. 1, a proton exchange membrane fuel cell and its operating principle.
Figures 2A, 2B:
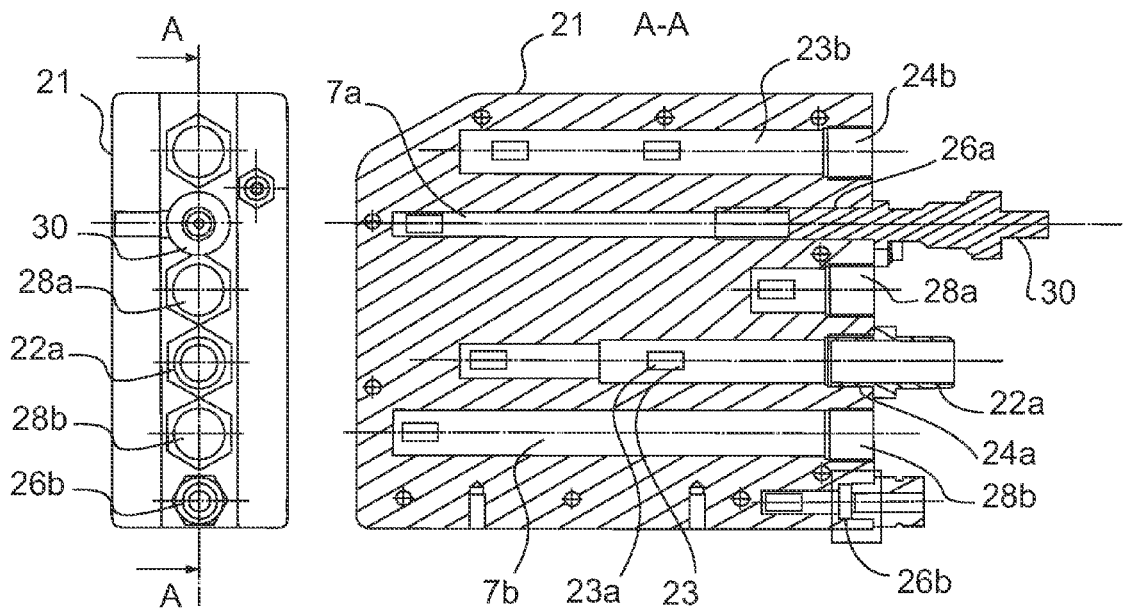
FIGS. 2a and 2b, an example of a fluid delivery head for a fuel cell.
Figure 3:
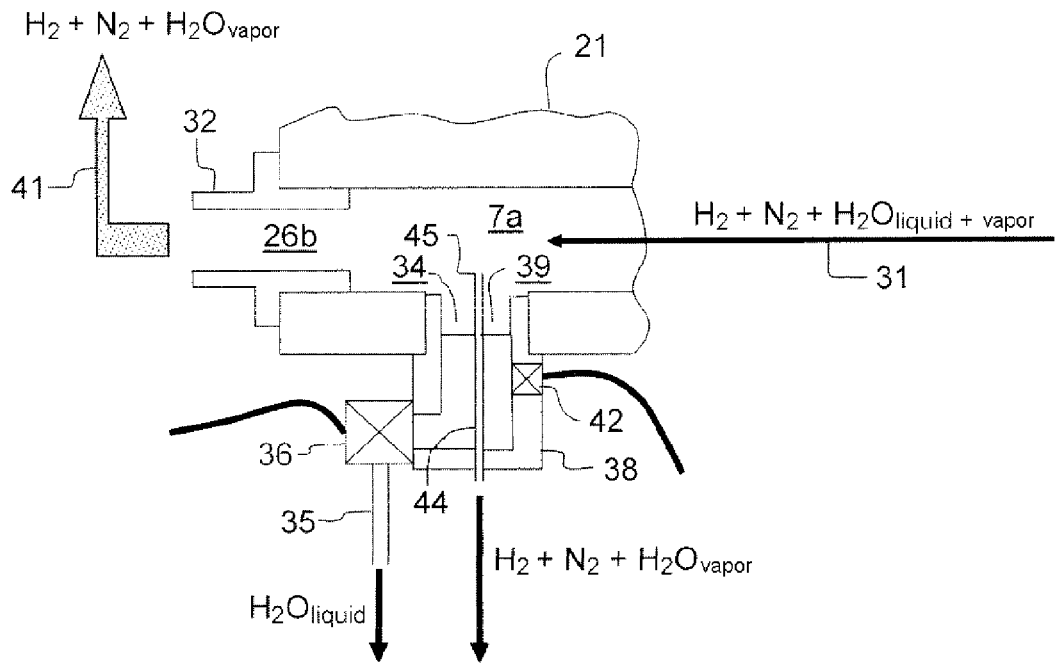
FIGS. 3 and 4, a part of the fluid delivery head concerned by the invention.
Figure 4:
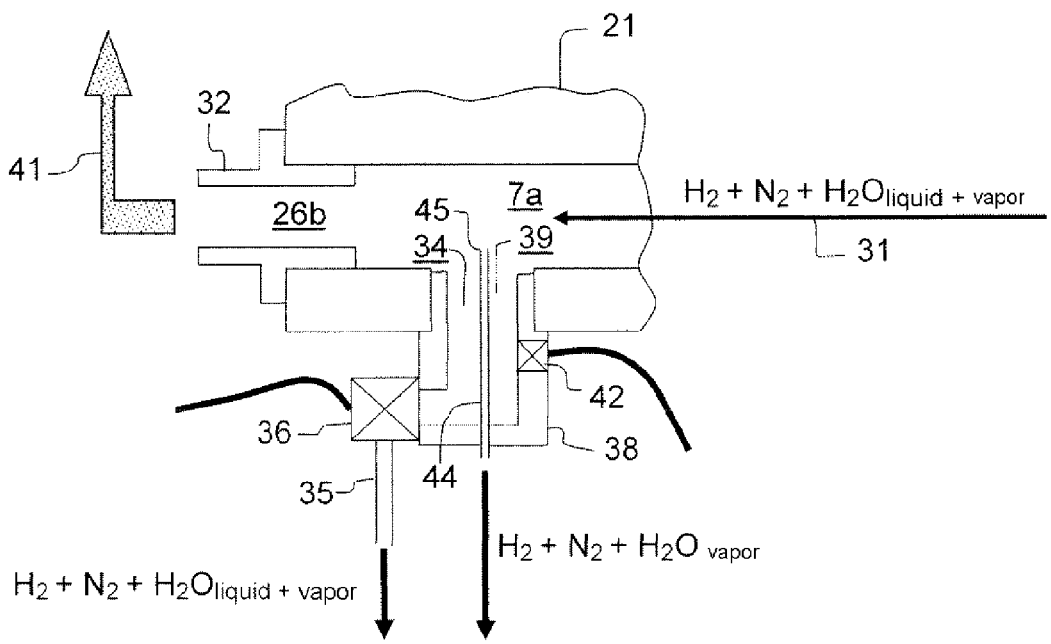

FIGS. 3 and 4 show a cross-sectional view of a part of the fluid delivery head 21. The delivery head 21 comprises the outlet orifice 26b of the delivery line 7a. The delivery line 7a is in communication with an active part of the fuel cell, in this instance the delivery layer 6a on the anode 2 side. Consequently, a mixture of fluids 31 containing hydrogen $H_2$ not consumed by the oxidation reaction, nitrogen $N_2$ and water in liquid and gaseous form $H_2O_{liquid+vapor}$ arrives from the active part of the fuel cell and heads toward the outlet orifice 26b. A connector 32 connects the delivery line 7a to an external circuit such as a hydrogen feed circuit, not shown. According to the invention, the delivery line 7a comprises a cavity 34 in communication with a discharge pipe 35 via a solenoid valve 36. The cavity 34 is made, for example, in the form of the delivery head 21 or, as shown in FIGS. 3 and 4, is made by a pipe 38 opening into the delivery line 7a via an orifice 39 made in the delivery head 21. The latter embodiment allows the invention to be applied to delivery heads 21 for which the cavity 34 was not originally planned. The invention allows, during the passage of a liquid in the cavity 34, the guiding of this liquid in the cavity 34. When the solenoid valve 36 is closed, the liquid, for example water in liquid form $H_2O_{liquid}$, is stored in the cavity 34, and when the solenoid valve 36 is open, the liquid is discharged to the discharge pipe 35.

According to one particular embodiment, the cavity 34 is formed in the region of the outlet orifice 26b. This embodiment makes it possible to separate the water present in liquid form $H_2O_{liquid}$ from the rest of the fluid mixture 31, notably hydrogen $H_2$, nitrogen $N_2$ and water $H_2O$ in gaseous form $H_2O_{vapor}$. The rest of the fluid mixture 31 is referred to as the gaseous mixture 41. According to this embodiment, during the passage of the fluid mixture 31 in the cavity 34, the water in liquid form $H_2O_{liquid}$ is guided in the cavity 34, while the gaseous mixture 41 is directed toward the outlet orifice 26b.

According to one particular embodiment, the cavity 34 is formed at a bottom point of the delivery line 7a. The term "bottom point" means the point in the delivery line 7a where a liquid naturally accumulates due to the effect of the Earth's gravity. This embodiment makes it possible to collect in the cavity 34 all of the water in liquid form $H_2O_{liquid}$ present in the delivery line 7a. Consequently, the amount of liquid water $H_2O_{liquid}$ in the delivery line 7a, and thus in the elemental cell(s) 1, may be precisely controlled by monitoring the amount of water present in the cavity 34.

According to one particular embodiment, the solenoid valve 36 is connected to means for controlling its opening. These means comprise, for example, an independent computer or a system for management of the functioning of the fuel cell. The means for controlling the opening of the solenoid valve 36 may also comprise a liquid level sensor 42 located in the delivery line 7a, for example connected to the computer. According to this embodiment, the opening of the solenoid valve 36 may be controlled as a function of a level of liquid in the delivery line 7a. The solenoid valve 36 is, for example, open when the liquid sensor 42 detects the presence of liquid, and is closed when the liquid sensor 42 does not detect any liquid.

In one embodiment, shown in FIGS. 3 and 4, the liquid level sensor 42 is located in the cavity 34, above the solenoid valve 36. In other words, the liquid level sensor 42 and the solenoid valve 36 are arranged such that a liquid can accumulate by gravity in the cavity 34 before reaching the liquid level sensor 42. This embodiment makes it possible to conserve a minimum amount of water in liquid form $H_2O_{liquid}$ at the bottom of the cavity 34 while at the same time avoiding overflow of the cavity 34. Thus, the gaseous mixture 41 does not run the risk of being discharged via the discharge pipe 35, and the liquid water $H_2O_{liquid}$ is discharged from the delivery line 7a.

In one embodiment, the means for controlling the opening of the solenoid valve 36 comprise a pressure sensor located in the delivery line 7a. This pressure sensor may be connected to a computer or to the system for management of the functioning of the fuel cell. The pressure sensor provides information regarding the pressure prevailing inside the delivery line 7a. This pressure may also be taken into account for the piloting of the opening of the solenoid valve 36. In particular, the solenoid valve 36 may be opened when the pressure passes above a predetermined threshold. All the liquid water $H_2O_{liquid}$ may then be discharged via the discharge pipe 35. The opening of the solenoid valve 36 also makes it possible to discharge all or some of the fluid mixture 31, thus reducing the pressure in the delivery line 7a. This operating phase is shown in FIG. 4. The solenoid valve 36 can then be reclosed either when the pressure returns below a certain value, or after a certain time. The combination of the pressure sensor, the solenoid valve 36 and the discharge pipe 35 acts, in point of fact, as an excess-pressure check valve.

According to one particular embodiment, the delivery head 21 comprises a tube 44 for discharging gases from the delivery line 7a. The tube 44 may cross the cavity 34 in order to obtain a compact device. In particular, the discharged gases may be hydrogen $H_2$, nitrogen $N_2$ and water in gaseous form $H_2O_{vapor}$ of the fluid mixture 31. The tube 44 has, for example, an inside diameter of between 0.1 and 0.7 mm. The tube 44 allows periodic or continuous sampling of a certain amount of gases from the delivery line 7a. This sampling of gases notably limits the increase in concentration of nitrogen $N_2$ in the hydrogen $H_2$ feed circuit, thus regulating the ratio between hydrogen $H_2$ and the other gases present at the inlet of the delivery line 7a. As visible in FIGS. 3-4, the tube 44 is oriented downwardly from the inlet end of the tube.

In one embodiment, one end 45 of the tube 44 is located above the liquid level sensor 42. The gas present in the delivery line 7a may thus be sampled without discharging liquid water $H_2O_{liquid}$.

In summary, the invention can perform several functions with a minimum of elements and with reduced bulk. The invention notably performs a function of discharging liquid water $H_2O_{liquid}$, a function as an excess-pressure check valve and a function of regulating the amount of nitrogen $N_2$.

The invention claimed is:

1. A fluid delivery head for an electrochemical cell, comprising:
   a delivery line for delivering a fluid to an active part of the electrochemical cell, said delivery line having an inlet and an outlet,
   said delivery line comprising a cavity forming a downward protrusion of said delivery line between the delivery line inlet and the delivery line outlet, so that said cavity is capable of receiving liquid,
   a discharge pipe, an inlet of said discharge pipe being in communication with said cavity via a solenoid valve, and
   a gas discharge tube for discharging gases from the delivery line,
   wherein the gas discharge tube is oriented downwardly and crosses the cavity from an inlet end of the gas discharge tube located higher than the inlet of the discharge pipe.

2. The delivery head as claimed in claim 1, further comprising an outlet orifice for connecting the delivery line to an external circuit, wherein the cavity is formed in the region of the outlet orifice.

3. The delivery head as claimed in claim 1, wherein the cavity is formed at a bottom point of the delivery line.

4. The delivery head as claimed in claim 1, wherein the solenoid valve is connected to means for controlling the opening of the solenoid valve, comprising a liquid level sensor located in the delivery line.

5. The delivery head as claimed in claim 4, wherein the liquid level sensor is located in the cavity above the solenoid valve.

6. The delivery head as claimed in claim 4, wherein the means for controlling the opening of the solenoid valve comprises a pressure sensor located in the delivery line.

7. The delivery head as claimed in claim 4, wherein the inlet end of the tube is located above the liquid level sensor.

8. The delivery head as claimed in claim 1, wherein the cavity is made by a pipe opening into the delivery line via an orifice made in the delivery head.

9. A fuel cell comprising at least one elemental cell in which a redox reaction takes place for generating an electrical current between two electrodes of the fuel cell, said cell further comprising a delivery head as claimed in claim 1.

10. The delivery head as claimed in claim 5, wherein the means for controlling the opening of the solenoid valve comprises a pressure sensor located in the delivery line.

11. The delivery head as claimed in claim 5, wherein the inlet end of the tube is located above the liquid level sensor.

12. The delivery head as claimed in claim 6, wherein the inlet end of the tube is located above the liquid level sensor.

13. A fuel cell comprising at least one elemental cell in which a redox reaction takes place for generating an electrical current between two electrodes of the fuel cell, said cell further comprising a delivery head as claimed in claim 4.

14. A fuel cell comprising at least one elemental cell in which a redox reaction takes place for generating an electrical current between two electrodes of the fuel cell, said cell further comprising a delivery head as claimed in claim 5.

15. A fuel cell comprising at least one elemental cell in which a redox reaction takes place for generating an electrical current between two electrodes of the fuel cell, said cell further comprising a delivery head as claimed in claim 6.

16. A fuel cell comprising at least one elemental cell in which a redox reaction takes place for generating an electrical current between two electrodes of the fuel cell, said cell further comprising a delivery head as claimed in claim 7.

17. A fuel cell comprising at least one elemental cell in which a redox reaction takes place for generating an electrical current between two electrodes of the fuel cell, said cell further comprising a delivery head as claimed in claim 8.

18. A fuel cell comprising at least one elemental cell in which a redox reaction takes place for generating an electrical current between two electrodes of the fuel cell, said cell further comprising a delivery head as claimed in claim 10.

19. A fuel cell comprising at least one elemental cell in which a redox reaction takes place for generating an electrical current between two electrodes of the fuel cell, said cell further comprising a delivery head as claimed in claim 11.

20. A fuel cell comprising at least one elemental cell in which a redox reaction takes place for generating an electrical current between two electrodes of the fuel cell, said cell further comprising a delivery head as claimed in claim 12.

21. The delivery head as claimed in claim 1, wherein the gas discharge tube extends across the cavity from the gas discharge inlet to a bottom wall of the cavity.

* * * * *